(12) United States Patent
St. Clair (10) Patent No.: US 8,885,110 B1
(45) Date of Patent: Nov. 11, 2014

(54) FLAT SCREEN MONITOR PROTECTIVE PANEL

(76) Inventor: Chris St. Clair, Wausau, WI (US)

( * ) Notice: Subject to any disclaimer, the term of this patent is extended or adjusted under 35 U.S.C. 154(b) by 854 days.

(21) Appl. No.: 13/004,594

(22) Filed: Jan. 11, 2011

Related U.S. Application Data (60) Provisional application No. 61/293,843, filed on Jan. 11, 2010.

(51) Int. Cl.
*H04N 5/64* (2006.01)

(52) U.S. Cl.
USPC .......................................................... 348/836

(58) Field of Classification Search
USPC .......................................................... 348/836
IPC .......................................................... H04N 5/64
See application file for complete search history.

(56) References Cited

U.S. PATENT DOCUMENTS

| | | | |
|---|---|---|---|
| 5,592,241 A | 1/1997 | Kita et al. | |
| 5,627,606 A * | 5/1997 | Pember et al. | 348/818 |
| 6,137,548 A | 10/2000 | Uchida et al. | |
| 6,469,752 B1 | 10/2002 | Ishikawa et al. | |
| D504,899 S * | 5/2005 | Ellis et al. | D14/450 |
| 6,948,692 B2 | 9/2005 | Leachman | |
| 6,967,635 B2 * | 11/2005 | Hung | 345/32 |
| 7,362,386 B2 | 4/2008 | Huber | |
| 2005/0094113 A1 | 5/2005 | Allaire et al. | |
| 2007/0215501 A1 | 9/2007 | Hanson et al. | |

* cited by examiner

*Primary Examiner* — Tung Vo
(74) *Attorney, Agent, or Firm* — Robert C. Montgomery; Montgomery Patent & Design (57) ABSTRACT

A protective device for a flat display monitor comprises a thin transparent protective shielding covering the entire front viewing area of the display monitor. The device is removably attached and secured to the frame of the display monitor using brackets and adjustable clamping members. Once installed, the display monitor is protected from environmental threats or other incidental damage.

9 Claims, 7 Drawing Sheets

FLAT SCREEN MONITOR PROTECTIVE PANEL

RELATED APPLICATIONS

The present invention was first described in and claims the benefit of U.S. Provisional Application No. 61/293,843 filed Jan. 11, 2010, the entire disclosures of which are incorporated herein by reference.

FIELD OF THE INVENTION

The present invention relates generally to flat screen monitors, and in particular, to an attachable protective cover for such a monitor.

BACKGROUND OF THE INVENTION

Home video game systems are more popular than ever. Modern technological advancements in gaming systems have resulted in literally hundreds of games with unprecedented depth and detail. As these systems evolved, so have the ergonomic properties of the handheld game controllers that are used with them.

The game controllers used with the WII® video gaming system and similar motion-sensing units are of a wireless nature and are held in one's hand. Such controllers utilize the motion of the user's hands and arms to generate movements on screen. While such gaming systems are certainly very fun to play, the rapid and aggressive movement of the controller can result in it being accidentally thrown across the room.

Unfortunately, as televisions have grown in height and width, both the probability of accidentally striking the screen in such a manner and the cost of rectifying the damage have increased proportionally. If such a controller should strike the screen of a plasma or liquid crystal display (LCD) flat screen monitor, damage will likely result. Repairs of such screens can cost into the hundreds or thousands of dollars, and often end up requiring the complete replacement of the television unit.

Various attempts have been made to provide protective devices for television or display device screens. Examples of these attempts can be seen by reference to several U.S. patents. U.S. Pat. No. 5,592,241, issued in the name of Kita et al., describes an image display device with a screen protection arrangement peripherally surrounding a display screen of the device.

U.S. Pat. No. 6,137,548, issued in the name of Uchida et al., describes a mounting structure for a display device including a frame on which a screen is held and a protecting panel retained in place over the screen with a Z-form holding member.

U.S. Pat. No. 6,469,752, issued in the name of Ishikawa et al., describes an attachable protective screen for an image display device including a top bracket and a bottom bracket which receive a protector screen.

U.S. Pat. No. 7,362,386, issued in the name of Huber, describes an integrated structural screen panel for protection television including a protective panel which correspondingly mates with the television cabinet to contain and protect a lenticular screen and a Fresnel screen of the television.

While these devices fulfill their respective, particular objectives, each of these references suffer from one (1) or more of the aforementioned disadvantages. Many such devices are difficult to install on an existing monitor or display device. Also, many such devices are difficult to remove once installed. Furthermore, many such devices mount to a monitor or display device in a manner which requires modification or permanent damage to the monitor. Accordingly, there exists a need for a protective panel for a monitor or similar flat screen display device without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a protective device for flat display screens which is readily removable and attachable from existing devices in a manner which does not necessitate permanent damage or alteration of the existing device. Thus, the object of the present invention is to solve the aforementioned disadvantages and provide for this need.

To achieve the above objectives, it is an object of the present invention to protect an entire viewing surface of a flat screen monitor such as a television screen from environmental threats including thrown objects. The device includes a transparent plastic frontal pane, a rectangular perimeter frame, a pair of top-mounted hooks, and a plurality of swing clips.

Another object of the present invention is to comprise a height and a width corresponding to the dimensions of the screen.

Yet still another object of the present invention is to provide an uninhibited view of the display through the frontal pane by comprising the frontal pane of a polymeric plastic material which may comprise additional enhancements such as non-glaring coatings, tinting, or polarizing.

Yet still another object of the present invention is to support the device by engaging a top edge of the monitor with the hooks. Each hook includes an "L"-shaped appendage integrally molded to the perimeter frame.

Yet still another object of the present invention is to horizontally secure the device to the monitor with the plurality of swing clips. Each swing clip includes an arcuate plastic hook-shaped member which pivots about a hinge portion of the swing clip. Each hook-shaped member applies a retaining spring force to a rear surface of the monitor to secure the device in place.

Yet still another object of the present invention is to secure and protect the monitor by further comprising each swing clip of a cup-shaped foot portion including a high-friction material which stabilizes the device against the rear surface of the monitor and prevents scratching of the monitor.

Yet still another object of the present invention is to prevent the frame from scratching the monitor by including a plurality of rubber bumpers arranged along a rear surface of the frame. The bumpers provide a non-scratching interface between the frame and the monitor and also provide a protective gap between the panel and the viewing surface portion to protect the viewing surface from damage when the panel is struck with an impact force.

Yet still another object of the present invention is to include at least one alternate embodiment including a pivoting clamp and a stationary clamp in lieu of the swing clips. The pivoting clamp and stationary clamp extend from the frame around to the rear surface of the monitor and are selectively secured to the monitor with a pair of manual spindles which apply a clamping force to the monitor. Each spindle includes a pad which provides secure, non-damaging engagement of the rear surface of the monitor.

Yet still another object of the present invention is to provide a method of utilizing the device that provides a unique means of procuring a model of the device having suitable width and height dimensions which match dimensions of an existing flat panel monitor; rotating the swing clips to a forward position; lowering the device over an upper edge portion of the monitor; engaging the hooks to establish an installed vertical position of the device; laterally centering the device upon the monitor; rotating the swing clips rearwardly around each vertical side portion of the monitor; flexing and expanding the swing clips to enable insertion of edge portions of the monitor within the arcuate portion of the swing clips; releasing each swing clip against the rear surface of the monitor; establishing a stable high-friction contact between the foot portions of each swing clip and the monitor; and benefiting from improved protection of the flat panel monitor.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 protective panel
11 pane
12 frame
13 hook
14 swing clip
15 hinge
17 foot
18 bumper
20 alternate protective panel
22 alternate frame
23 alternate hook
24 pivoting clamp
25 stationary clamp
27 spindle
28 thumb grip
29 pad
30 alternate hinge
60 flat screen monitor

DETAILED DESCRIPTION OF THE PREFERRED EMBODIMENT

Figure 3:
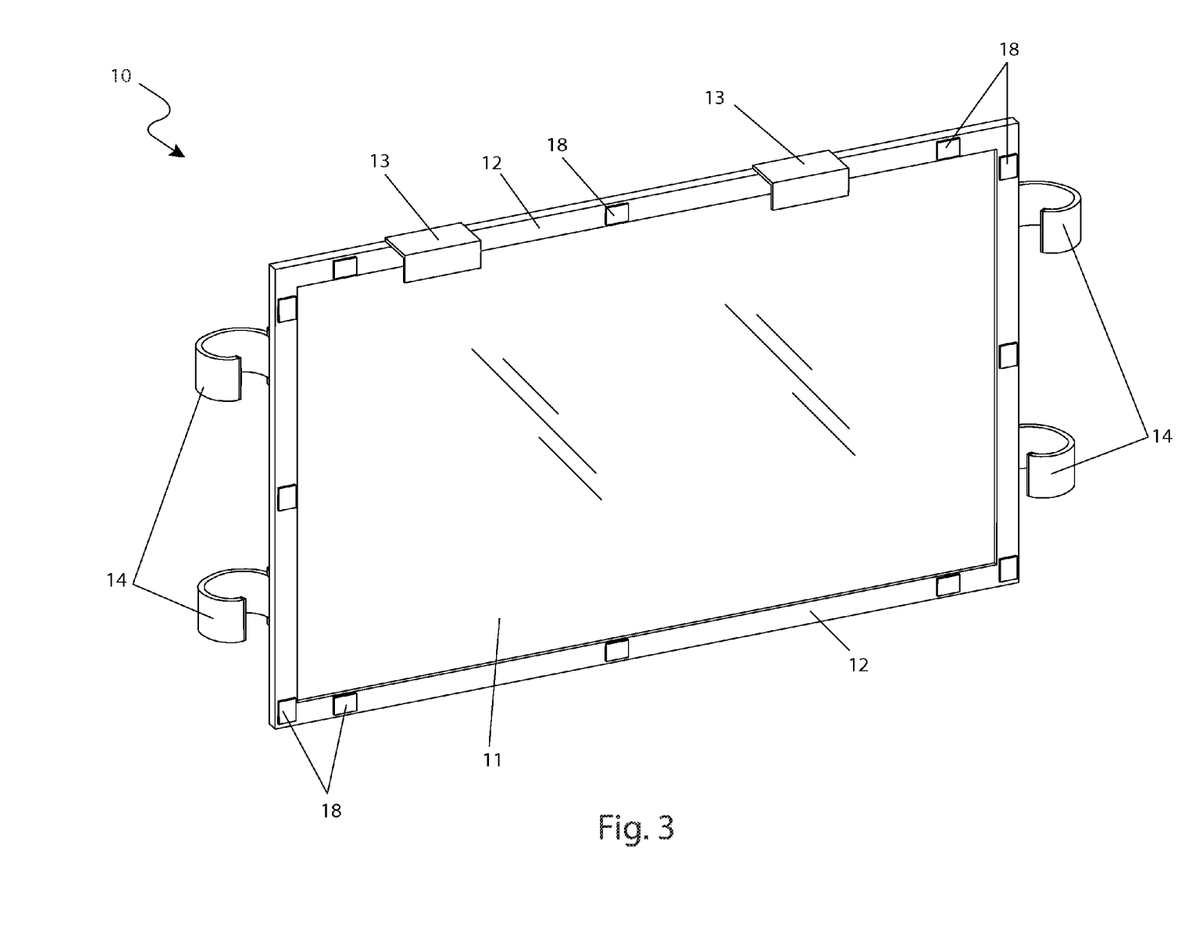
FIG. 3 is a rear perspective view of the flat screen monitor protective panel 10, according to the preferred embodiment of the present invention.
Figure 4:
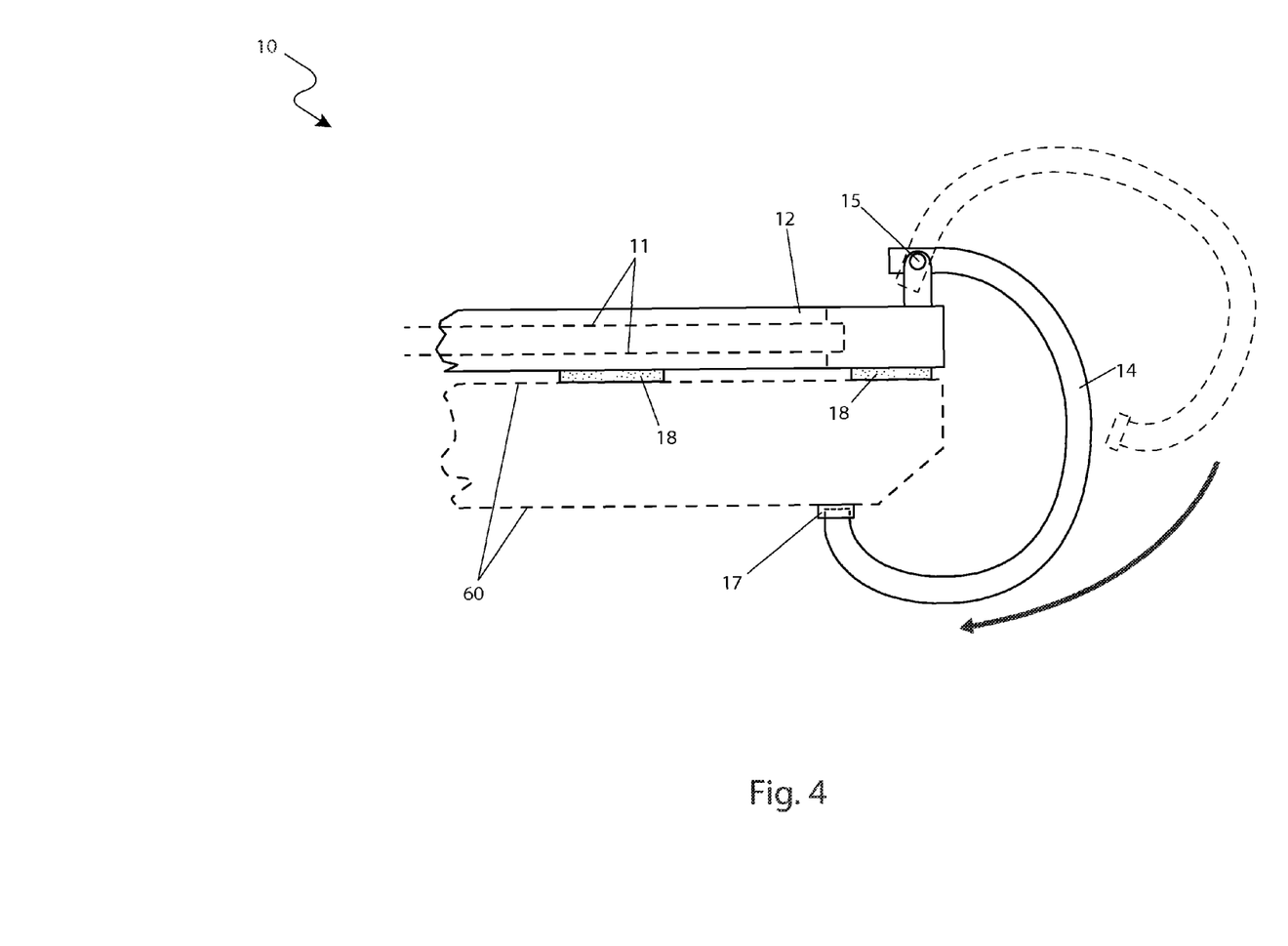
FIG. 4 is a top view of a swing clip portion 14 of the flat screen monitor protective panel 10, according to the preferred embodiment of the present invention.
Figure 5:
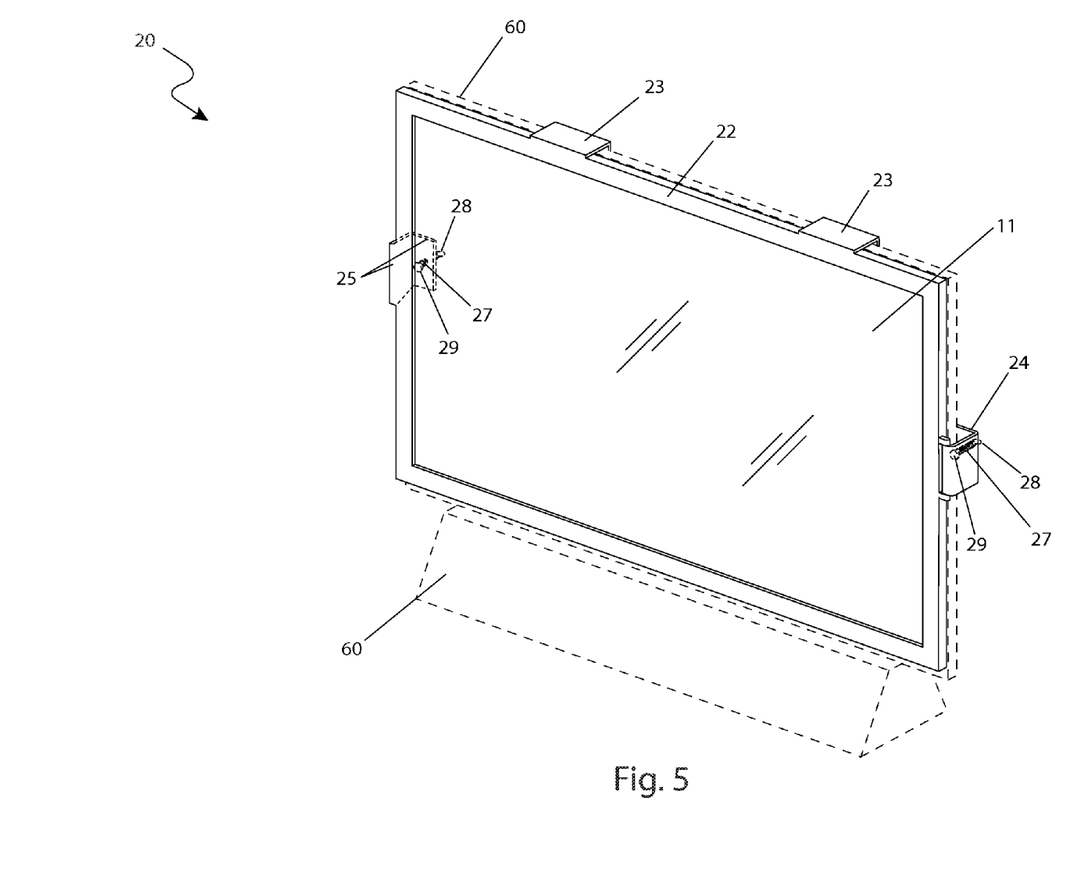
FIG. 5 is an environmental perspective view of an alternate protective panel 20 installed onto a flat screen monitor 60, according to an alternate embodiment of the present invention.
Figure 6:
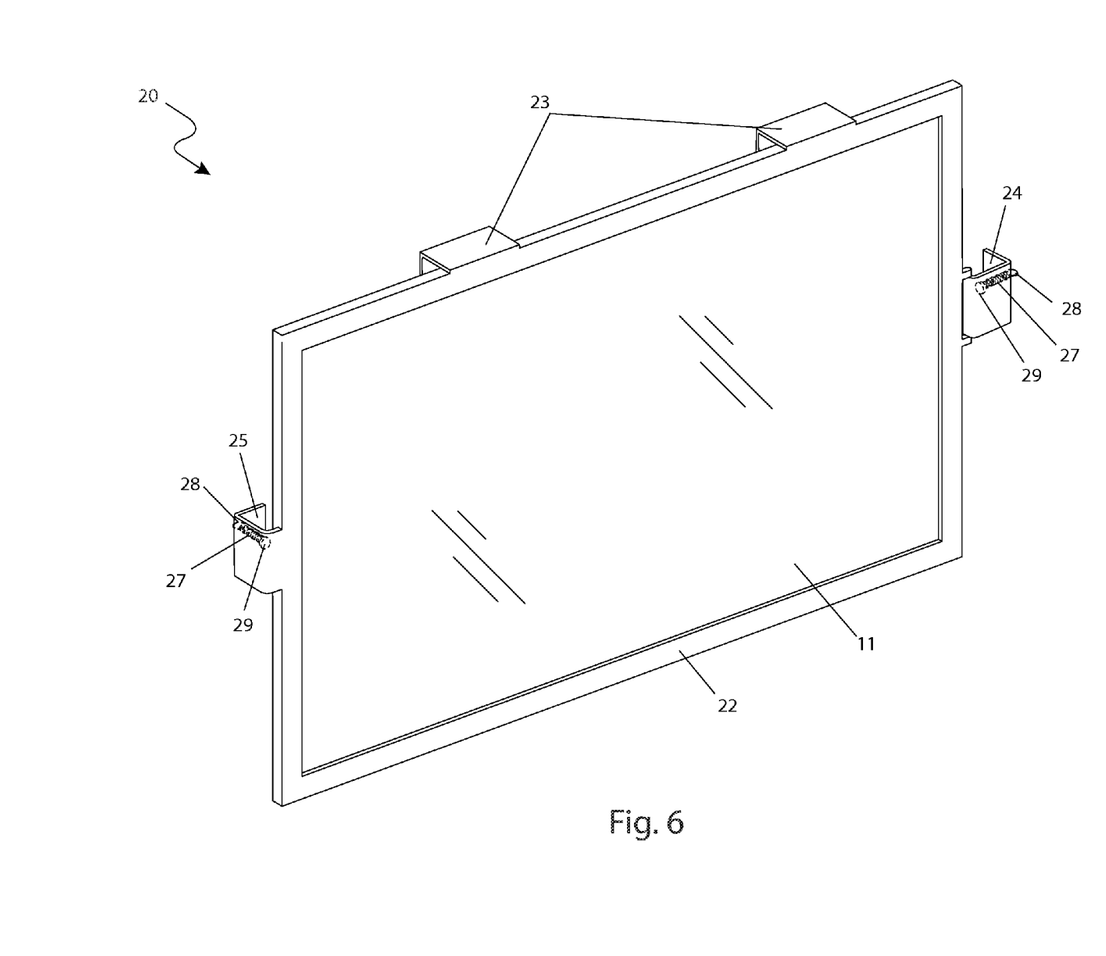
FIG. 6 is a perspective view of the alternate protective panel 20, according to the alternate embodiment of the present invention; and, FIG. 7 is a top close-up view of a pivoting clamp portion 24 of the alternate protective panel 20, according to the alternate embodiment of the present invention.
Figure 7:
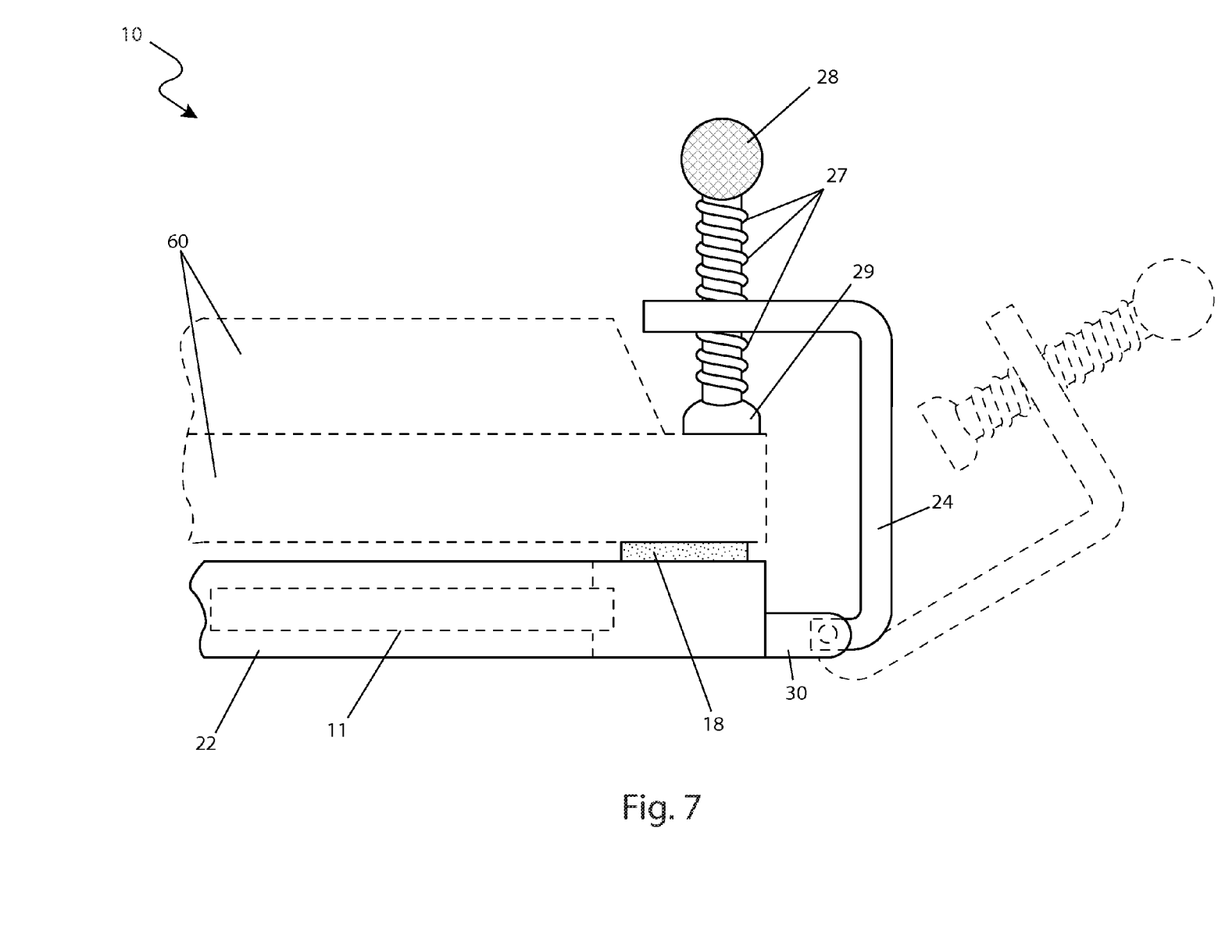

The best mode for carrying out the invention is presented in terms of its preferred embodiment, herein depicted within FIGS. 1 through 4, and an alternate embodiment, herein depicted within FIGS. 5 through 7. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a protective panel (herein described as the "device") 10, which provides a means for protecting an entire viewing surface of a flat screen monitor 60, such as, but not limited to: a television screen, a computer monitor, a process controller read-out, or the like; against damage caused by thrown or falling objects or a variety of other possible environmental threats. The device 10 comprises a transparent plastic frontal pane 11 further comprising a rectangularly-shaped perimeter frame 12. The frame 12 provides an attachment means to top and side edges of the flat screen monitor 60 via a pair of top-mounted hooks 13 and at least four (4) swing clips 14 along side edges.

Figure 1:
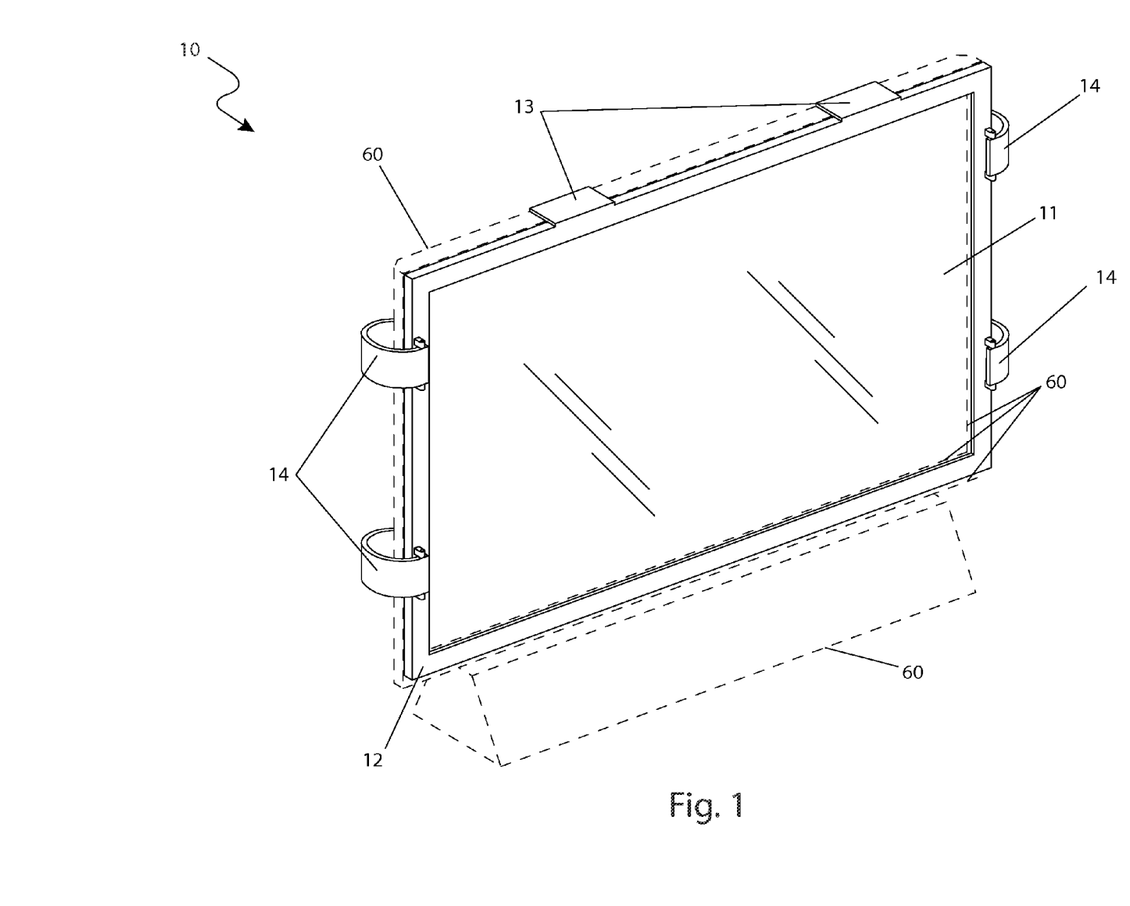
FIG. 1 is an environmental perspective view of a flat screen monitor protective panel 10 installed onto a flat screen monitor 60, according to a preferred embodiment of the present invention.

Referring now to FIG. 1, a perspective environmental view of the device 10, according to the preferred embodiment of the present invention, is disclosed. The device 10 is depicted as installed onto a flat screen monitor 60 and secured by means of the top-mounted hooks 13 and a pair of swing clips 14 along each side edge; however, it is envisioned that the device 10 may be introduced having various width and height dimensions so as to match various flat screen display apparatuses 60 and therefore may have a corresponding greater or lesser number of side-mounted swing clips 14, and as such should not be interpreted as a limiting factor of the device 10. It is further envisioned that the frame 12, hooks 13, and swing clips 14 be preferably fabricated of durable plastic materials manufactured in molding and extrusion processes and made available in various decor-matching colors; however, said portions of the device 10 may also be made of non-magnetic metallic materials such as aluminum, without deviating from the concept, and as such should not be interpreted as a limiting factor of the device 10.

Figure 2:
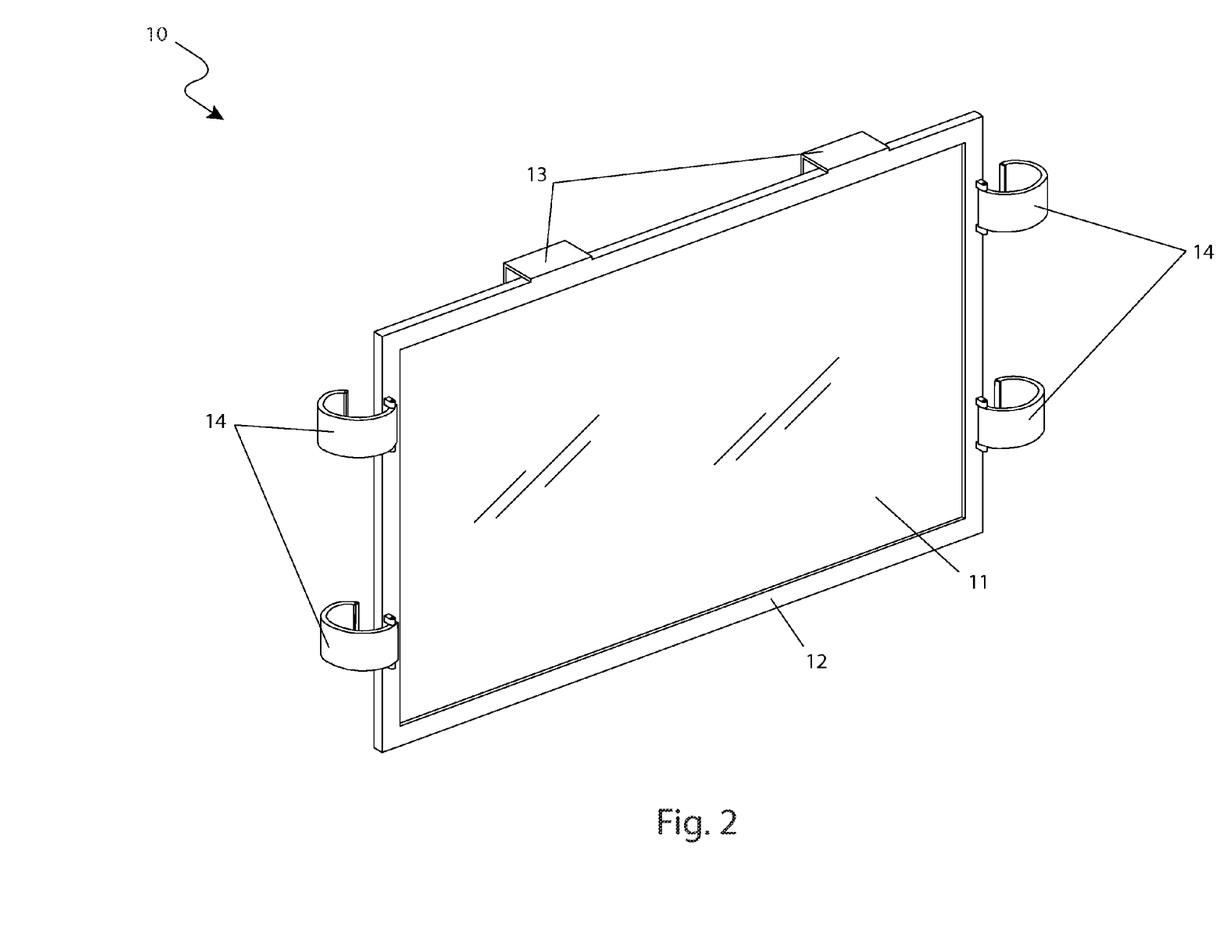
FIG. 2 is a front perspective view of the flat screen monitor protective panel 10, according to the preferred embodiment of the present invention.

Referring now to FIGS. 2 and 3, front and rear perspective views of the device 10, according to the preferred embodiment of the present invention, are disclosed. The device 10 comprises a transparent plastic pane 11, envisioned to be made of acrylic or equivalent polymeric plastic material, such as, but not limited to: PLEXIGLAS®, LEXAN®, or the like. It is further envisioned that the pane 11 may comprise additional enhancements such as non-glaring coatings, tinting, polarizing, or the like. The pane 11 is securely affixed to the frame 12 preferably by means of chemical bonding or equivalent processes such as, but not limited to: plastic vibration welding, rivets, screws or the like. The frame 12 further comprises a pair of hooks 13. The hooks 13 comprise "L"-shaped appendages being integrally-molded into said frame 12 and extending rearwardly so as to captivate a top edge of the flat screen monitor 60, thereby establishing an installed vertical location of the device 10. It is further envisioned that said hooks 13 may also be affixed to the frame 12 by means such as, but not limited to: chemical bonding, spot welding, or riveting, without deviating from the concept. And as such should not be interpreted as a limiting factor of the device 10. The device 10 further comprises a plurality of swing clips 14 being pivotally attached to vertical side portions of the frame 12 via respective hinge portions 15. The swing clips 14 comprise arcuate plastic hook-shaped members which apply a retaining spring force to a rear surface portion of the flat screen monitor 60, thereby securely mounting the device 10 and ensuring the protection of a viewing area portion of the monitor 60 (see FIG. 4).

Referring now to FIG. 4, a top view of a swing clip portion 14 of the device 10, according to the preferred embodiment of the present invention, is disclosed. The frame 12 further comprises an axial hinge 15 which provides a pivoting attachment means to the swing clip 14 to enable installation and removal of the device 10 from the flat screen monitor 60 as illustrated here. The swing clips 14 comprise arcuate plastic members envisioned being made using a flexible plastic material capable of being expanded so as to encompass a rear portion of the flat screen monitor 60, thereby applying a retaining spring force to a rear surface portion of the flat screen monitor 60. Each swing clip 14 further comprises a cup-shaped foot portion 17 being adhesively bonded to a rearward end portion and made using a high-friction material such as rubber, soft plastic, or the like to stabilize the swing clip 14 against the rear surface of the flat screen monitor 60. The device 10 also comprises a plurality of rubber bumpers 18 arranged along a rear surface of the frame 12. Said bumpers 18 provide a non-scratching contact means between the device 10 and the flat screen monitor 60 as well as establishing a protective gap between the pane 11 and the viewing surface portion of the flat screen monitor 60, thereby providing additional protection against accidental impact forces. Said bumpers 18 comprise rectangular sections of high-friction flat rubber stock being adhesively bonded to a rear surface of the frame 12, thereby further stabilizing the device 10 upon the flat screen monitor 60.

Referring now to FIGS. 5 and 6, environmental and perspective views of an alternate protective panel 20, according to an alternate embodiment of the present invention, are disclosed. The alternate protective panel 20 is depicted in FIG. 5 being installed upon a flat screen monitor 60, and being secured thereonto by means of a pair of alternate hooks 23, a pivoting clamp 24, and a stationary clamp 25. The alternate protective panel 20 provides an alternate clamping means, thereby allowing attachment to said alternate protective panel 20 to various makes, models, and types of flat screen monitors 60 in addition to flat screen monitor 60 being suitable to the previously described preferred embodiment 10. As with the preferred embodiment of the device 10, it is understood that the alternate protective panel 20 may be introduced having various width and height dimensions so as to match various flat screen display apparatuses 60 and therefore may have a corresponding greater or lesser number of pivoting 24 and stationary 25 clamps, and as such should not be interpreted as a limiting factor of the alternate protective panel 20.

Referring now to FIG. 7, a top close-up view of a pivoting clamp portion 24 of the alternate protective panel 20, according to the alternate embodiment of the present invention, is disclosed. The alternate protective panel 20 comprises the transparent pane 11 being encased within an alternate frame 22. Said alternate frame 22 comprises similar construction and materials as the previously described preferred frame 12; however, said alternate frame 22 provides additional means of attachment to other flat screen monitors 60. Said alternate frame 22 further comprises a pair of alternate hooks 23, a pivoting clamp 24, and a stationary clamp 25. The alternate hooks 23 comprise similar construction and function as the previously described preferred embodiment clamps 13 being integrally-molded into a top edge of the alternate frame 22. The stationary clamp 25 preferably comprises an "L"-shaped appendage being an integrally-molded feature at an intermediate position along a vertical side portion of the alternate frame 22 and being positioned opposite a location of the pivoting clamp 24. The stationary clamp 25 comprises a rigid rearwardly extending "L"-shaped appendage while the pivoting clamp 24 provides a rotational means via an alternate hinge portion 30 in a similar manner as the previously described swing clip 14. The pivoting clamp 24 and the stationary clamp 25 both comprise respective threaded clamping spindle portions 27 being threadingly attached to an outward leg of each clamp 24, 25. Said spindle 27 comprises a threaded shaft portion further comprising a soft non-marring hemispherical pad 29 affixed to a proximal end, and a common thumb grip 28 appendage at a distal end. In use, the spindle 27 is digit-operated to apply a clamping force to the flat screen monitor 60 via contact of the pad 29 against a rear surface. Said spindle 27 allows each of the clamps 24, 25 to function in a manner similar to a conventional "C"-clamp-type device to secure the alternate protective panel 20 to the flat screen monitor 60.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be installed as indicated in FIG. 1, or alternately as indicated in FIG. 5.

The method of utilizing the preferred device 10 may be achieved by performing the following steps: procuring a model of the device 10 having suitable width and height dimensions which match said dimensions of an existing flat panel monitor 60 onto which the device 10 is to be applied; rotating the swing clips 14 to a forward position so as to clear side portions of the monitor 60; lowering the device 10 over an upper edge portion of the monitor 60; allowing engagement of the hooks 13, thereby establishing an installed vertical position of the device 10; laterally centering the device 10 upon the monitor 60; rotating the swing clips 14 rearwardly around each vertical side portion of the housing of the monitor 60; flexing and expanding said swing clips 14 to enable insertion of edge portions of the monitor 60 within the arcuate portion of the swing clips 14; releasing each swing clip 14 against the rear surface of the monitor 60; establishing a stable high-friction contact between the foot portions 17 of said swing clip 14 and said monitor 60; and, benefiting from improved protection of a flat panel monitor 60 afforded a user of the present invention 10.

The method of utilizing the alternate protective panel 20 may be achieved by performing the following additional steps: rotating each pivoting clamp 24 outwardly; threadingly retracting each spindle 27 to obtain sufficient clearance using the thumb grips 28; sliding the alternate device 20 in a lateral until the corresponding side portion of the monitor 60 is inserted within an open side portion of the stationary clamp 25; lowering the alternate protective panel 20 allowing the alternate hooks 23 to rest upon a top portion of the monitor 60; ensuring that the alternate protective panel 20 is laterally centered over the monitor 60; rotating the pivoting clamp 24 rearwardly about the alternate hinge 30 to engage the corresponding side edge portion of the monitor 60; and, securing the alternate protective panel 20 to the monitor 60 by manually rotating each spindle 27 in a clockwise direction using the thumb grip portions 28 until finger-tight.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A protective panel attachable to a monitor, comprising:
   a transparent frontal pane;
   a perimeter frame supporting said frontal pane on upper, lower, and opposing side portions and affixed thereto;
   an upper attachment means located on an upper portion of said perimeter frame;
   a stationary means located on a side portion of said perimeter frame, comprising:
      an "L"-shaped first appendage comprising an integrally molded portion of said perimeter frame and extending rearwardly; and,
      a threaded spindle having a threaded shaft portion engaging a rearward portion of said first appendage, further comprising a soft non-marring hemispherical pad affixed to a proximal end and a thumb grip appendage at a distal end; and,
   a pivoting attachment means hingedly attached to an opposing side portion of said perimeter frame;
   wherein said upper attachment means removably attaches said protective panel to an upper portion of said monitor;
   wherein tightening of said threaded spindle enables said first appendage to captivate a side edge of said first side portion of said monitor in order to removably attach said protective panel thereto;
   wherein said pivoting attachment means removably and adjustably attaches said protective panel to an opposing second side portion of said monitor;
   wherein said protective panel protects said monitor from environmental damage; and,
   wherein said protective panel does not interfere with viewing of said monitor.

2. The protective panel of claim 1, wherein said frontal pane further comprises an acrylic plastic material.

3. The protective panel of claim 2, wherein said frontal pane further comprises one or a combination of the following: a non-glaring coating, tinting, or polarizing.

4. The protective panel of claim 1, wherein said perimeter frame further comprises a plurality of rubber bumpers arranged along a rear surface thereof;
   wherein said plurality of bumpers provide a protective contact means and establishing a protective gap between said protective panel and said monitor.

5. The protective panel of claim 4, wherein said plurality of bumpers each further comprises a rectangular section of high-friction flat rubber stock adhesively bonded to said perimeter frame.

6. The protective panel of claim 1, wherein said upper attachment means further comprises an "L"-shaped appendage comprising an integrally molded portion of said perimeter frame and extending rearwardly, such that said appendage captivates a top edge of said monitor.

7. The protective panel of claim 6, further comprising a pair of appendages each located on opposing equidistant positions from a vertical centerline of said perimeter frame.

8. The protective panel of claim 1, wherein said pivoting attachment means further comprises:
   a hinge portion comprising an integrally molded portion of a vertical side portion of said perimeter frame;
   an "L"-shaped second appendage pivotally attached to said hinge portion and extending rearwardly therefrom; and,
   a threaded spindle having a threaded shaft portion engaging a rearward portion of said second appendage, further comprising a soft non-marring hemispherical pad affixed to a proximal end and a thumb grip appendage at a distal end;
   wherein said pad provides a protective contact means to said monitor;
   wherein said pivoting second appendage enables a variable positioning of said second appendage onto said monitor; and,
   wherein tightening of said threaded spindle enables said second appendage to captivate a side edge of said second side portion of said monitor.

9. The protective panel of claim 8, wherein said stationary attachment means and said pivoting attachment means are located at vertically aligned positions from a horizontal centerline of said perimeter frame.

\* \* \* \* \*